Figure 3:
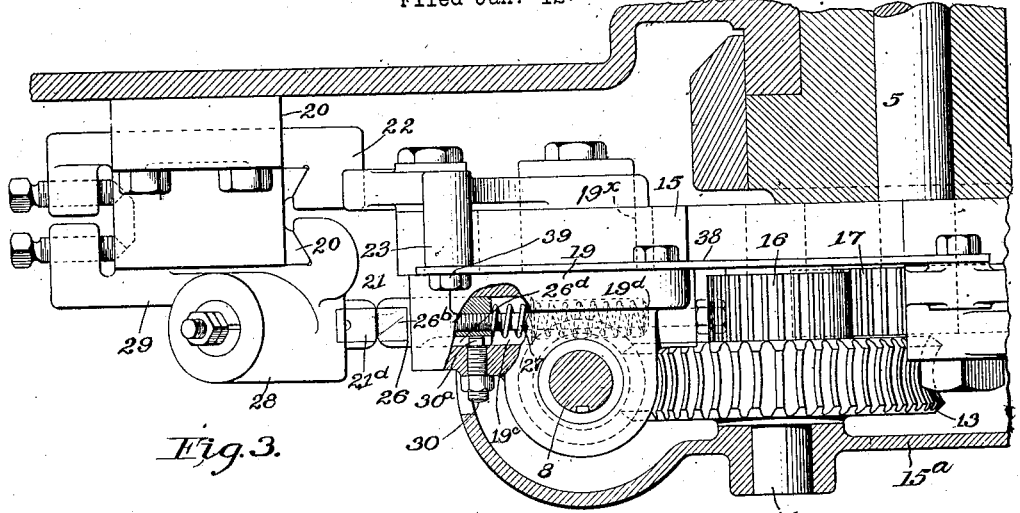

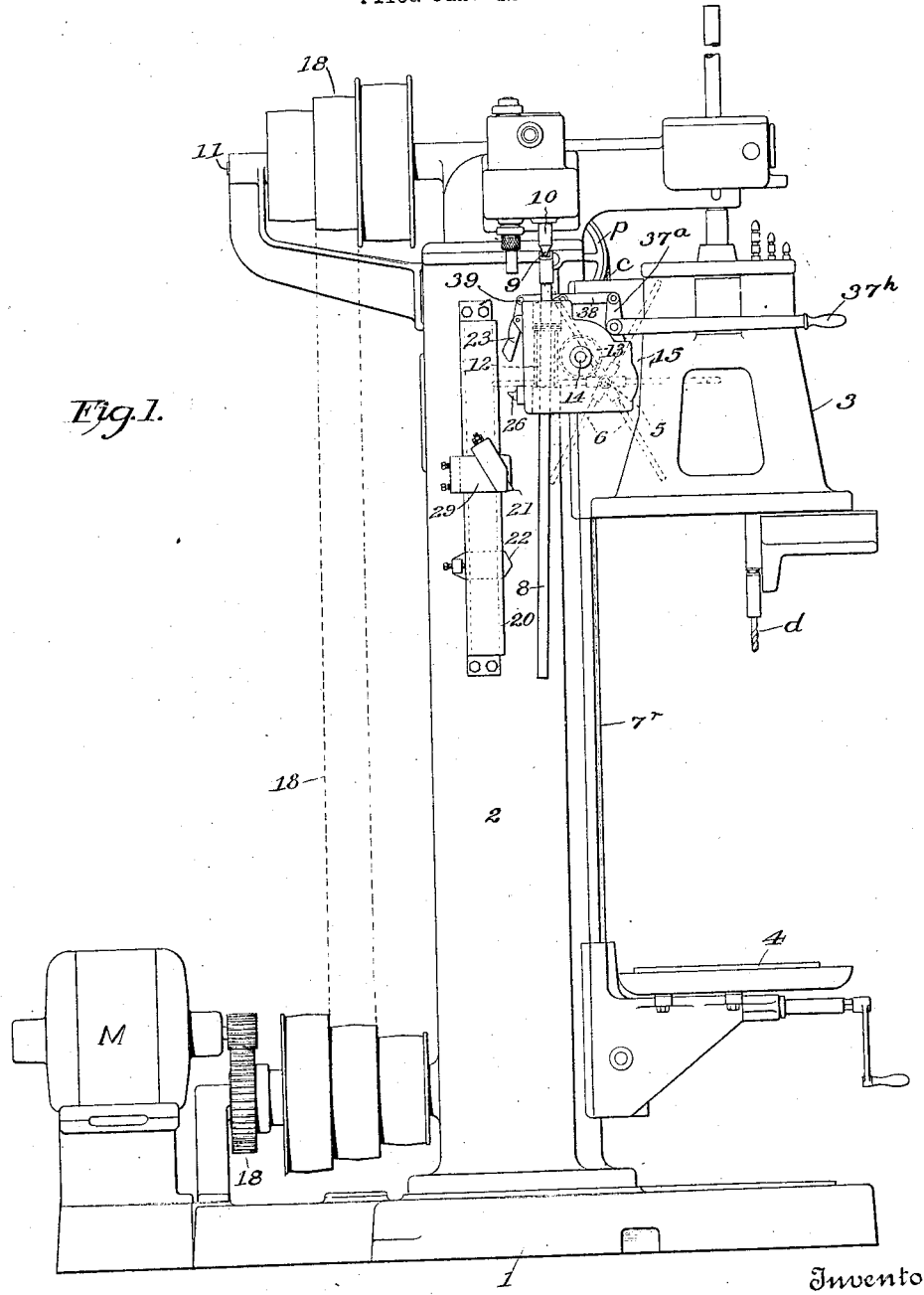

Aug. 17, 1926.

P. C. BURTON 1,596,479

AUTOMATIC FEED ENGAGING MECHANISM

Filed Jan. 12, 1924   3 Sheets-Sheet 2

Inventor
Paul C. Burton
By Attorney
Albert F. Nathan

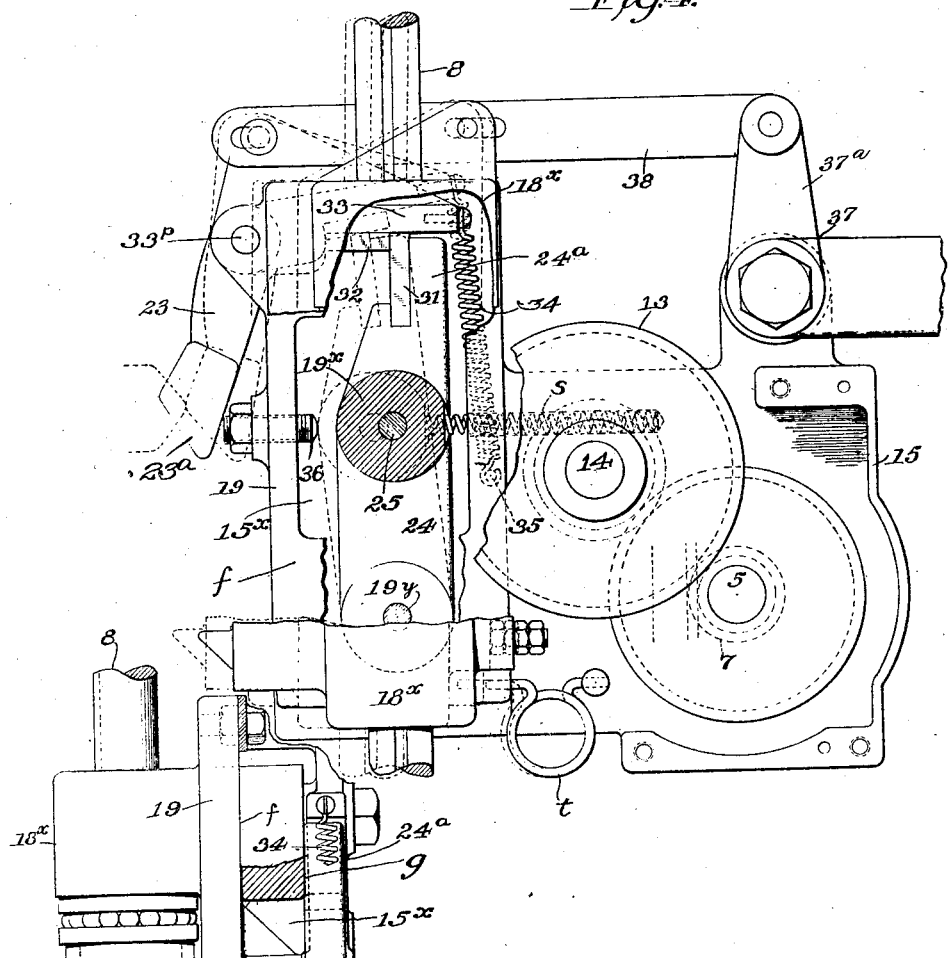
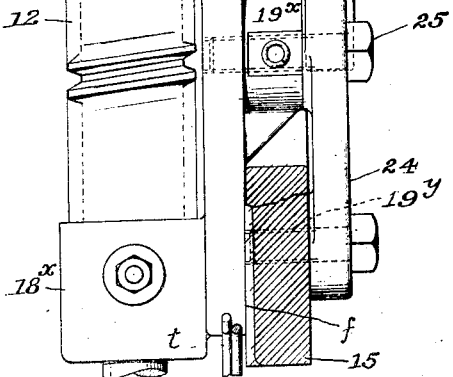

Patented Aug. 17, 1926.

1,596,479

UNITED STATES PATENT OFFICE.

PAUL C. BURTON, OF RICHMOND, INDIANA, ASSIGNOR TO THE NATIONAL AUTOMATIC TOOL COMPANY, OF RICHMOND, INDIANA, A CORPORATION OF INDIANA.

AUTOMATIC FEED-ENGAGING MECHANISM.

Application filed January 12, 1924. Serial No. 685,816.

This invention relates to machine tools and more particularly to multiple drilling machines which are semi-automatic in their operation; that is, those in which automatic and manual operations are combined to form one complete machining operation.

The invention has for an object so to improve machines of this character that certain operations which have heretofore been performed manually by the attendant will be performed mechanically and automatically by the machine. The attendant, thus relieved of certain duties, is permitted better to concentrate his attention on those operations which he must manually perform; his hands being thereby freed for such performance. It is obvious that the fewer are the manual operations the greater will be the quantity and accuracy of the work produced.

Multiple drilling machines are commonly constructed with a stationary column, a normally stationary work-support carried thereby and a drill-head slidably mounted on said column and movable toward and from the work support. In the normal operation of these machines, the work is placed on the work-support and the drill-head (with the drills rotating therein) is initially lowered to bring the drills into contact with the work. This preliminary lowering of the drill-head is to save time effected rapidly; as by means of a hand wheel carried by the drill head, which rotates a pinion meshing with a stationary rack secured to the machine column. The subsequent feeding of the drill into the work is (by a subsequent manual operation) usually effected mechanically and automatically at a much slower rate than the rate at which the drills are brought into contact with the work. Heretofore it has been the usual practice for the operator to rotate the hand wheel to lower the drill-head until the drills nearly touched the work, then manually to manipulate other devices to throw into action the mechanical feed. It was at that instant (which is critical in the drilling operation i. e., when the drill points are being located at the work), that the operator was required to release one actuating element and engage and manipulate another actuating element to start the mechanical feed.

This invention proposes to relieve the operator of one of his duties by providing automatically acting means for starting the mechanical feed when the drill-head has been manually lowered to a predetermined point.

Another object of this invention is to provide an automatic power feed which may be put into action by the downward movement of the drill head and to combine therewith means for automatically discontinuing the power feed when the holes have been drilled to a predetermined depth.

These objects have been attained by providing means actuated by the vertical movements of the drill-head for connecting and disconnecting the mechanical feed, whereby (when the drill-head has been lowered manually to a predetermined point) the power feed will be rendered effective, and (when the drills have entered the work a predetermined distance) the power feed will then be rendered ineffective. A convenient way of accomplishing this result consists in constructing the feeding mechanism with a constantly rotating driving member and a normally stationary driven member adapted, when rotated, to effect a vertical movement of the drill-head, together with means for intermittently establishing an operative connection between the driving and driven members. The driving and driven members preferably, but not necessarily, consist of a worm and worm-wheel respectively of which the former is splined to a shaft mounted for lateral movements towards and from the worm-wheel. Suitable shifting dogs are preferably adjustably secured upon the column of the machine and act to shift the shaft laterally during the downward movement of the drill-head to cause the worm and worm-wheel to be engaged and disengaged at predetermined points.

Other objects and advantages will be in part indicated in the following description and in part rendered apparent therefrom in connection with the annexed drawings.

To enable others skilled in the art to fully apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
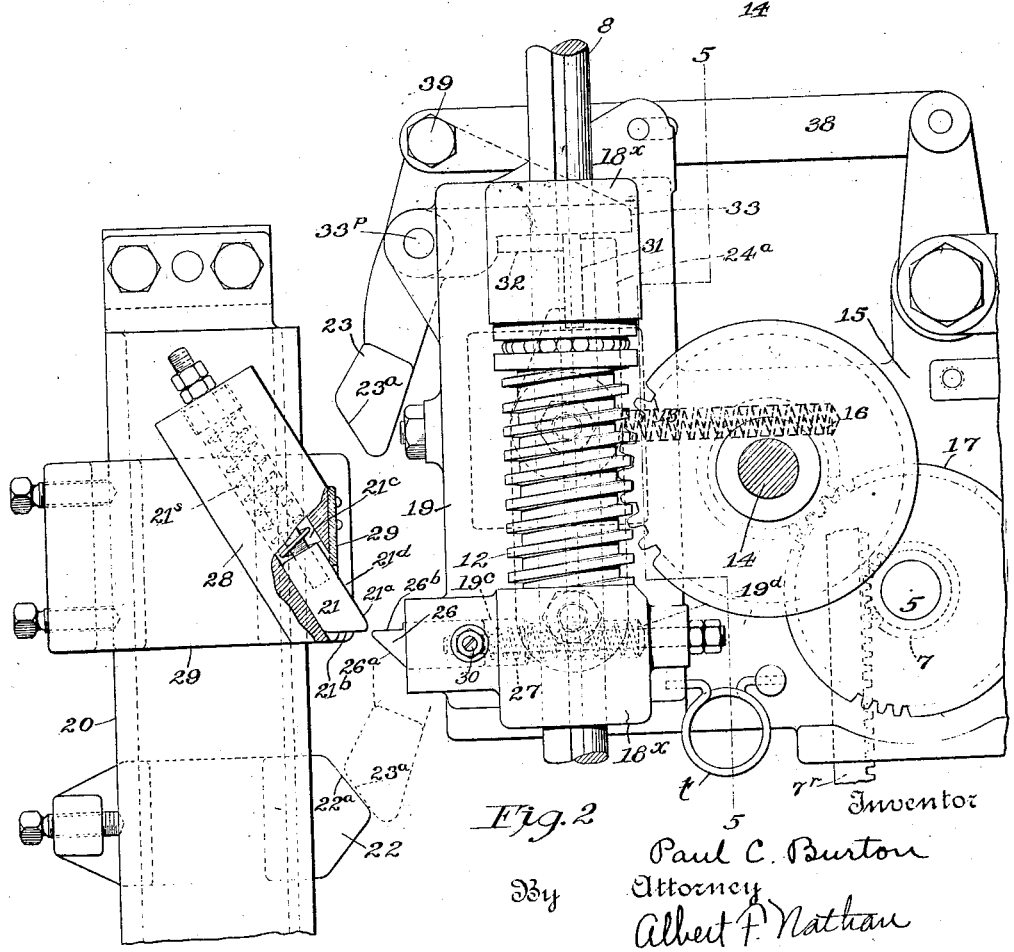

Fig. 1 is a side elevation of a multiple drilling machine embodying the present invention. Fig. 2 is an enlarged side elevation, partly in section of a portion of Fig. 1 showing the means for automatically starting and stopping the action of the power feed. Fig. 3 is a top view partly in section of Fig. 2. Fig. 4 is a view similar to Fig. 2 with certain parts omitted and other parts broken away, better to show the means for maintaining the power feeding mechanism either in or out of action and Fig. 5 is a section on the line 5—5 of Fig. 2.

Referring more particularly to the drawings the invention is disclosed as embodied in a multiple drilling machine comprising a base 1 supporting a vertical column 2, upon which is slidably mounted the usual drill-head 3. The weight of the drill head is supported in the usual manner as by means of a cable $c$ passing over a pulley P and attached at one end to the drill-head and at its opposite end to a suitable counterweight not shown. The drill-head is adapted to be raised and lowered on the column to bring the drills $d$ (one only of which is shown) into contact with the work held upon a work-table 4 adjustably secured to the standard 2. The drills $d$ are supported and rotated in a manner common to drilling machines and as this mechanism forms no part of the present invention detailed illustration and description thereof is deemed unnecessary.

To effect a manual feed of the drill-head on the column there is journaled within the head a horizontal shaft 5 to which is secured a hand-wheel 6 (shown in Fig. 1) and a pinion 7 (shown in Fig. 2). The pinion 7 meshes with a vertically disposed rack $7^r$ secured to the column 2 and, upon rotation of the shaft 5 moves the drill-head vertically. Power actuated means is also provided for rotating the shaft 5 to effect the mechanical feed. This means comprises a continuously rotating shaft 8 connected by a universal joint 9 to a shaft 10 rotated from a shaft 11 in a manner common to these machines. A worm 12 is splined to the shaft 8 and, at certain times, is brought into mesh with a worm-wheel 13 loose on a shaft 14. This shaft is supported at one end in a bracket 15 secured to the head 3, and at the other end in a cover $15^a$ secured to the bracket. Fixedly secured to the worm-wheel is a gear 16 which meshes with a gear 17 secured on the shaft 5. Thus it will be seen that the translation of the drill-head on the column may be effected either manually, by the hand-wheel 6, shaft 5 and pinion 7, or mechanically through the shaft 8, worm 12, worm-wheel 13, gears 16 and 17, shaft 5 and pinion 7. The worm 12 is splined to the shaft 8 and held against endwise movement by bosses $18^x$ formed integrally with a laterally movable carriage 19 supported upon the bracket 15 in a manner later to be described.

Power to actuate the feeding mechanism and to rotate the drill spindles may be supplied by a motor M and transmitted to the shaft 11 by suitable driving mechanism indicated generally as 18.

As before stated the worm 12 and worm-wheel 13 are adapted to be brought into engagement by the downward movement of the drill-head. To this end, there is secured to the side of the column a bar 20 upon which is adjustably secured a feed-engaging dog 21 and a feed-releasing dog 22. The dog 21 acts to shift the carriage 19, and the worm carried thereby, laterally in opposition to springs $s$ and $t$, carried by the bracket, to mesh the worm 12 and worm-wheel 13 which, due to the continuous rotation of the shaft 8 effects the mechanical feed of the drill-head as previously explained. When the power feed is thus connected the manual feed is rendered ineffective by means of the locking action between the teeth of the worm and worm-wheel. A latch mechanism, later to be described, serves to prevent untimely disengagement of the worm and worm-wheel. This mechanical feed continues to lower the drill-head until, at a predetermined point, a latch-releasing lever 23 fulcrumed upon the carriage 19, contacts with the dog 22 thereby releasing the latch and permitting outward movement of the carriage 19 under the action of the springs $s$ and $t$. The carriage is maintained against the finished face $f$ of the bracket 15 and held against vertical movement thereon, while it is moved horizontally by means now to be described.

The carriage 19 is formed at its rear side with a boss $19^x$ which projects through an opening $15^x$ in the bracket 15. A link 24, which has its lower end journaled at $19^y$ to the bracket 15, is pivotally mounted on the boss by means of a bolt 25. Thus the carriage is supported upon the bracket but is permitted to move relatively thereto. The bolt 25 also holds the link 24 in contact with the surface $g$ of the bracket and holds the carriage 19 in contact wiht the surface $f$ thereby preventing separation of the carriage from the bracket.

Within a bore $19^c$, formed in the lower end of the member 19, is a plunger 26 having an inclined lower surface $26^a$ and a flat upper surface $26^b$. This plunger is normally pressed outwardly by a relatively heavy spring 27 and in the outer position of the member 19, (i. e. the position in which the worm 12 and worm-wheel 13 are out of mesh) as when the drillhead is being lowered manually, overlies the projecting end of the dog 21. The dog 21 is also in the form of a spring-pressed plunger which is movable in a cavity 21$^c$ formed in an offset portion 28 of a clamp member 29 adjustably secured upon the bar 20. The dog 21 presents an inclined surface 21$^a$ and a flat lower surface 21$^b$, which co-act at certain times with the surfaces 26$^a$ and 26$^b$ of the plunger 26.

When the drill-head is lowered manually from the position shown in Fig. 1, in which the worm and worm-wheel are disengaged, the inclined surface 26$^a$ of the plunger 26 contacts with the inclined surface 21$^a$ of the plunger 21, and, as the spring 27 is of a strength greater than the combined strength of the springs $s$ and $t$, the carriage 19 will be forced bodily to the right as viewed in Figs. 1 and 2. However, should the threads of the worm be so positioned at this time that they bear directly on the outer ends of the teeth of the worm-wheel 13 and thereby prevent proper meshing of the teeth the plunger 26 will be moved inwardly in the cavity 19$^c$ and thus compress the spring 27. When the continued rotation of the worm has positioned the teeth for proper engagement the spring 27 will act against the end 19$^d$ of the bore 19$^c$ and shift the carriage 19 and the worm 12 to the right to the position shown in Fig. 2. The plunger 21 is held against rotation in the cavity 21$^c$ by a plate 29 secured to the portion 28 and which bears against the flat surface 21$^d$ of the plunger 21. A screw 30 threaded through the outer wall of the carriage 19 is provided with a reduced end 30$^a$ which tracks a guideway 26$^d$ in the plunger 26 and thereby prevents rotation of the plunger in the bore 19$^c$.

The worm 12 and worm-gear are maintained in mesh, until a predetermined downward feed of the drill head has been effected, by a latch mechanism now to be described. The link 24 has its end 24$^a$ extending above the pivot-bolt 25 and carries a latch plate 31 adapted when the worm and worm gear are meshed to bear against a second latch-plate 32 carried by a latch-lever 33. This latch-lever is in the form of a bell-crank lever pivoted at 33$^p$ upon the bracket 15 and provides a latch-releasing arm 23 later to be referred to. The latch lever 33 is normally maintained depressed by a coil spring 34 having one end attached to the lever and the other end secured at 35 to the bracket 15. The full line position of Fig. 4 shows the latch plate 31 held behind the latch plate 32 thereby holding the upper end of the link to the right. As the carriage 19 is secured to the link by the bolt 25 it is then likewise held to the right, i. e. in the position in which the worm 12 and worm-gear are in mesh.

With the worm and worm-wheel in mesh as just described the drill-head is fed downwardly to bring the bevelled end 23$^a$ of the latch-releasing lever 23 into engagement with the surface 22$^a$ of the dog 22. By a continued downward movement of the drill-head the surface 22$^a$ causes the lever 23—33 to be tipped about its pivot 33$^p$ thus lifting the end 33 and releasing the latch-plate 31 as shown in dotted lines in Fig. 4. The link 24 is then moved outwardly, or to the left as viewed in Fig. 4, by the spring $s$ and, due to its connection 25 with the carriage 19, it likewise moves that member laterally to disengage the worm 12 and worm-wheel 13. The spring $t$ also assists in moving the carriage 19 outwardly. A stop screw 36 adjustably secured in the bracket 15 serves to limit the outward movement of the link 24 and member 19 so as to stop the movement thereof as soon as the threads of the worm and worm-wheel are completely disengaged.

The holes now having been drilled to the predetermined depth and the power feed thrown out of action the drill-head may be raised manually by again rotating the hand wheel 6. During the upward movement of the drill-head, (the carriage 19 then being in its outward position as shown in dotted lines Fig. 4) the surface 26$^b$ of the plunger 26 underlies and contacts with the surface 21$^b$ of the plunger 21 which causes the plunger to be retracted upwardly and inwardly in its socket 21$^c$ against the action of the spring 21$^s$. When the plunger 26 has passed the plunger 21 the latter is again forced outwardly and downwardly by the spring 21$^s$ to the position shown in Fig. 2 where it remains in readiness to perform the next feed-engaging movement of the carriage 19.

An auxiliary feed releasing mechanism is also provided by which the power feed may be discontinued at any point in the drilling operation. This mechanism comprises a bell-crank lever 37, pivoted to the bracket 15, of which one arm forms a hand-lever 37$^h$. The other arm 37$^a$ is pivoted to one end of a link 38 having a pin-and-slot connection with the bracket 15. The opposite end of the link is connected at 39 with the latch-lever 23 and, upon elevation of the hand-lever, acts to swing the latch-lever 23 about its pivot 33$^p$ to disengage the latch-plates 31 and 32 and thereby permit the springs $s$ and $t$ to disconnect the worm 12 and worm-wheel 13.

Without further analysis, the foregoing will so fully reveal the gist of this invention that others can, by applying current knowledge, readily adapt it for various utilizations by retaining one or more of the features that, from the stand point of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a drilling machine, the combination comprising a column; a drill head vertically movable on said column; manually actuated means for moving said head vertically in opposite directions; a power shaft; a worm splined to said power shaft and carried by said head; power feed mechanism comprising a worm wheel mounted on said head and adapted to mesh with said worm; means operative upon movement of the head downwardly through a predetermined distance to move the worm into mesh with the worm wheel; resilient means exerting a force tending to move the worm away from the worm wheel; a latch mechanism for holding the worm in mesh with the worm wheel; and means operative upon further downward movement of the head for releasing the latch to separate the worm from the worm wheel.

2. In a drilling machine, the combination comprising a column; a drill head vertically movable on said column; manually actuated means for moving said head vertically in opposite directions; a power shaft; a worm splined to said power shaft and carried by said head; power feed mechanism comprising a worm wheel mounted on said head and adapted to mesh with said worm; resilient means exerting a force tending to hold said worm and the worm wheel out of mesh; means operative upon movement of the head downwardly through a predetermined distance to engage the worm and worm wheel; a latch mechanism for holding the worm and worm wheel in mesh; and means operative upon further downward movement of the head for releasing the latch to permit said resilient means to separate the worm from the worm wheel.

3. A multiple drilling machine combining a column; a drill-head vertically movable thereon; manually actuated means for moving said drill-head vertically in opposite directions on said column; a power actuated feeding mechanism for moving said drill-head downwardly on said column and comprising a worm and a worm wheel; resilient means exerting a force tending to hold the worm out of engagement with said worm wheel; an automatic feed engaging mechanism, actuated by the downward manual movement of said drill-head, for meshing said worm with the worm wheel and simultaneously therewith rendering said manual feed ineffective; and means actuated by a further downward feed of the drill-head for automatically disengaging said worm and worm wheel and again rendering effective said manual feed.

4. A multiple drilling machine combining a column; a drill-head vertically movable thereon; manually actuated means for moving said drill head vertically in opposite directions on said column; power actuated feeding mechanism for moving said drill-head downwardly on said column; an automatic feed engaging mechanism actuated by the downward manual movement of said drill-head for rendering effective said power feed and simultaneously therewith rendering said manual feed ineffective, said feed mechanism comprising a worm and a worm wheel; resilient means exerting a force tending to hold the worm away from the worm member; a latch mechanism for maintaining said power feed in operation by holding said worm in mesh with said worm wheel; and means actuated by a further downward feed of the drill head for releasing said latch to permit said power feed to be made ineffective, said power feed being rendered ineffective by releasing the worm from the worm wheel.

5. A machine-tool combining a column; a member movable thereon; a rotary shaft movable laterally with respect to said movable member; a worm splined to said shaft and movable vertically with said movable member; a rack carried by said column; a worm-wheel journaled within said movable member; gear connections between said worm-wheel and said rack; manually actuated means for moving the movable member on said column; means actuated by the manual movement of said movable member and controlled by an adjustable dog on the column to operatively connect said worm and worm-wheel to effect a power feed of said movable member; and resilient means exerting a force tending to move the worm out of mesh with the worm wheel.

6. In a drilling machine constructed with a column and a drill-head vertically movable thereon; a feeding mechanism for said drill-head comprising a stationary rack carried by said column; a gear carried by said drill-head and meshing with said rack; manual means for rotating said gear to effect translation of said drill-head on said column; power means for rotating said gear to effect translation of said drill-head on said column; said power means including a worm-wheel; operative connections between said worm wheel and said gear; a power shaft laterally movable with respect to said worm-wheel; a worm splined to said shaft; means comprising a yieldable dog carried by the column for shifting said shaft laterally to engage said worm and worm-wheel, said shifting means being rendered effective by the manual feed of said drill head and means permitting retraction of said dog when the drill-head is moved in the opposite direction.

7. In a machine tool constructed with a column and a member movable thereon; manual means for translating said member on said column; a power-driven feeding mechanism for translating said member on said column, said last named feeding mechanism comprising a rack carried by said column and a gear carried by said movable member and meshing with said rack; a laterally movable shaft; means for rotating said shaft; a worm splined to said shaft and movable vertically with said movable member; a worm-wheel carried by said movable member; operative connections between said worm-wheel and the gear meshing with said rack; and means comprising a yieldable dog and an adjustable dog carried by said column for alternately connecting and disconnecting said worm and worm-wheel to alternately connect and disconnect said power feed.

8. A drilling machine combining a column; a drill-head movable thereon; manually controlled means for translating said drill-head on the column; a power driven feeding-mechanism for translating said drill-head on said column, said last named feeding mechanism comprising a bracket carried by said drill head; gear mechanism including a worm supported by said bracket; a stationary rack secured to said column and engaged by one of the gears of said gear mechanism; a rotatable shaft; means for rotating said shaft; a carriage linked to said bracket and movable laterally thereon; a worm held in said carriage and splined to said shaft; a spring acting to separate said worm and worm wheel; a dog adjustably secured on said column and adapted during manual downward movement of the drill-head to move said carriage laterally in opposition to the spring to engage said worm and worm gear; and a latch mechanism to hold said worm and worm-gear in engagement.

9. A drilling-machine combining a column; a drill-head movable thereon; a rack-and-pinion connection between said column and said drill-head; manual means for rotating said pinion to translate said drill-head on said column; a bracket secured to said drill-head; a carriage laterally movable on said bracket; a power shaft connected to said carriage and movable therewith; a gear member splined to said shaft; a train of gears supported by said bracket and operatively connected with said pinion resilient means for exerting a force tending to move the worm out of operative connection with said gear; automatic means for shifting said carriage to operatively connect said splined gear member with one of the gears of said gear-train to effect a power feed of said drill-head, said shifting means including a normally stationary dog maintained in the path of said movable member and adapted to contact therewith during the manual feed of said drill head.

10. A drilling machine combining a column; a drill-head movable thereon; manually actuated means for translating said drill head on said column; power driven means for translating said drill head on said column; said power feed including a worm-wheel; a bracket carried by said drill head for supporting said worm wheel; a carriage slidably supported on said bracket; a worm carried by said carriage; a power shaft operatively connected with said worm; means actuated by the manual feed of said drill-head for shifting said carriage to effect engagement of said worm and worm-wheel; said means comprising a dog carried by said column; a plunger slidingly fitted within said carriage and arranged in the path of said dog and adapted to be shifted thereby; and a yielding means intermediate said plunger and said carriage to permit of a delayed lateral shift of said carriage during a continued downward movement thereof.

11. In a drilling machine, the combination comprising a column; a drill head vertically movable on said column; manually actuated means for moving said drill head vertically in opposite directions on said column; a power shaft having a member splined thereto and carried by said head; a power feeding mechanism adapted to be connected to the member on the power shaft for moving said head downwardly on the column; automatic means actuated by the downward manual movement of the head for moving the member on the power shaft into operative engagement with the power feeding mechanism; resilient means exerting a force tending to move the worm away from the worm wheel; a latch for holding said member in engagement with the power feeding mechanism; and automatic means for releasing said latch upon further downward feeding of the head.

12. In a drilling machine, the combination comprising a column; a drill head vertically movable on said column; manually actuated means for moving said drill head vertically in opposite directions on said column; a power shaft having a member splined thereto and carried by said head; a power feeding mechanism adapted to be connected to the member on the power shaft for moving said head downwardly on the column; resilient means exerting a force tending to move the member on the power shaft out of operative connection with the power feed mechanism; automatic means actuated by the downward manual movement of the head for moving the member on the power shaft into operative connection with the power feeding mechanism; a latch for holding said member in engagement with the power feeding mechanism; and automatic means for releasing said latch upon further down feeding of the head through a predetermined distance.

In witness whereof, I hereunto subscribe my name.

PAUL C. BURTON.